J. E. LUCAS.
RUBBER WELT FOR SHOES.
APPLICATION FILED APR. 24, 1914.

1,173,287.

Patented Feb. 29, 1916.

Witnesses:
N. C. Lombard
Edward H. Allen.

Inventor:
John E. Lucas,
by Walter E. Lombard,
Atty.

UNITED STATES PATENT OFFICE.

JOHN E. LUCAS, OF BROCKTON, MASSACHUSETTS, ASSIGNOR TO FREDERICK R. WOODWARD, OF WABAN, MASSACHUSETTS.

RUBBER WELT FOR SHOES.

1,173,287.

Specification of Letters Patent.

Patented Feb. 29, 1916.

Application filed April 24, 1914. Serial No. 834,527.

*To all whom it may concern:*

Be it known that I, JOHN E. LUCAS, a citizen of the United States of America, and a resident of Brockton, in the county of Plymouth and State of Massachusetts, have invented certain new and useful Improvements in Rubber Welts for Shoes, of which the following is a specification.

This invention relates to welts for boots and shoes and has for its object the production of a new article of manufacture consisting of a welt molded from rubber and preferably having reinforcing material such as canvas embedded therein or secured to the faces thereof at such points where the stitches will be formed to secure the welt to the upper or the outsole to the welt.

The invention consists primarily of forming the welt at one operation of rubber with a groove in one face and a beveled edge on its opposite face.

The invention further consists in reinforcing said welt with canvas or some similar material wherever the stitches are to be formed for the purpose of attaching the welt either to the upper or the outsole.

The invention further consists in certain novel features of construction and arrangement of parts which will be fully understood by reference to the description of the drawings and to the claims hereinafter given.

Figure 1:
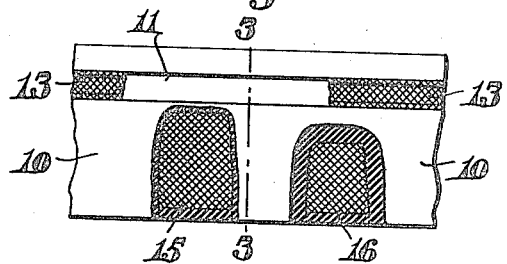
Figure 2:
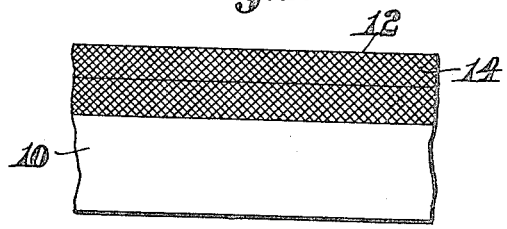
Figure 3:
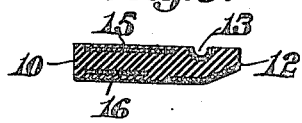

Of the drawings: Figure 1 represents a plan of a piece of a welt embodying the principles of the present invention, portions thereof being broken away. Fig. 2 represents an inverted plan of the same, and Fig. 3 represents a transverse section of the same, the cutting plane being on line 3—3 on Fig. 1.

Similar characters designate like parts throughout the several figures of the drawings.

In the drawings, 10 is the welt which is molded from rubber with the groove 11 in one face thereof near one edge and having a beveled edge 12 formed in its opposite face at the same time. By forming the welt of rubber the expense of beveling the edge of one face and grooving the opposite face, as is necessary in leather welts, is entirely dispensed with, thereby greatly simplifying the manufacture of the welt and materially reducing the cost thereof. To obviate the stitches pulling through the rubber when the welt is secured to the upper, the groove 11 has secured to its surface a strip 13 of reinforcing material, such, for instance, as canvas, while another strip 14 of reinforcing material is secured to the surface of the beveled edge 12. That portion of the welt to which the outsole of the shoe is to be secured is strengthened by having strips 15 and 16 of reinforcing material such as canvas embedded in the rubber near the outer edge thereof so that all danger of the securing stitches pulling through the welt will be overcome. This welt thus constructed is particularly adapted for use in the manufacture of shoes which are provided with rubber soles. It has been found difficult in practice to properly unite the rubber sole with the leather welt and leave a finished appearance. This objection is wholly obviated by the use of a rubber welt, as the adjacent faces will unite so as to give the appearance of a solid mass of rubber after the welt and sole has been trimmed. In the manufacture of the shoe when the rubber welt is used, by applying a rubber cement thereto the rubber sole may be united more securely thereto. It is obvious that the welt herein shown and described will accommodate itself to the curvature of the toe of the shoe much better than a leather welt in which there is comparatively no stretch.

It is believed that the operation and many advantages of this invention will be fully understood from the foregoing description.

Having thus described my invention, I claim:

1. A new article of manufacture consisting of a welt for boots and shoes molded from rubber with a groove in one face thereof.

2. A new article of manufacture consisting of a welt for boots and shoes molded from rubber with a groove in one face thereof, and a reinforcing material positioned in said groove.

3. A new article of manufacture consisting of a welt for boots and shoes molded from rubber with a groove in one face thereof and a beveled edge on its opposite face, and a reinforcing material secured to said beveled edge.

4. A new article of manufacture consisting of a welt for boots and shoes molded from rubber with a groove in one face and a beveled edge on its opposite face, the surfaces of said groove and beveled edge having reinforcing material secured thereto.

5. A new article of manufacture consisting of a welt for boots and shoes molded from rubber with a groove in one face thereof near one edge and reinforcing material embedded in said rubber near its opposite edge.

6. A new article of manufacture consisting of a welt molded from rubber provided with reinforcing strips of fabric extending lengthwise thereof.

7. A composite welt consisting of a layer of rubber having a channel or groove, and a layer of fibrous material affixed to the channeled side of the rubber layer.

8. A composite welt consisting of a rubber layer provided with a channel or groove, and a reinforcing layer of fibrous material affixed to said rubber layer.

9. A composite welt consisting of a body layer of rubber, a reinforcing layer of fibrous material applied thereto, and a second layer of rubber applied to the reinforcing layer and united with the said body layer.

10. A composite welt consisting of a layer of rubber provided with a channel or groove, and a reinforcing layer affixed to said rubber layer.

11. A composite welt consisting of a body layer of rubber provided with a channel or groove, a reinforcing layer affixed to the channeled side of the said body layer, a reinforcing layer applied to the upper side of said body layer, and a second layer of rubber united with the body layer of rubber.

12. A composite welt provided with rubber upper and lower surfaces and comprising a body layer of rubber having a channel or groove in one surface and a reinforcing layer of fibrous material affixed to said body layer.

Signed by me at 5 Post Office Sq., Boston, Mass., this 14th day of April, 1914.

JOHN E. LUCAS.

Witnesses:
WALTER E. LOMBARD,
NATHAN C. LOMBARD.